C. Aulls.
Feed Trough.
N° 63,688.  Patented Apr. 9, 1867.
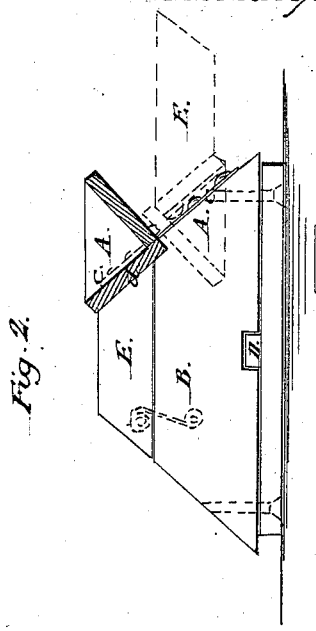
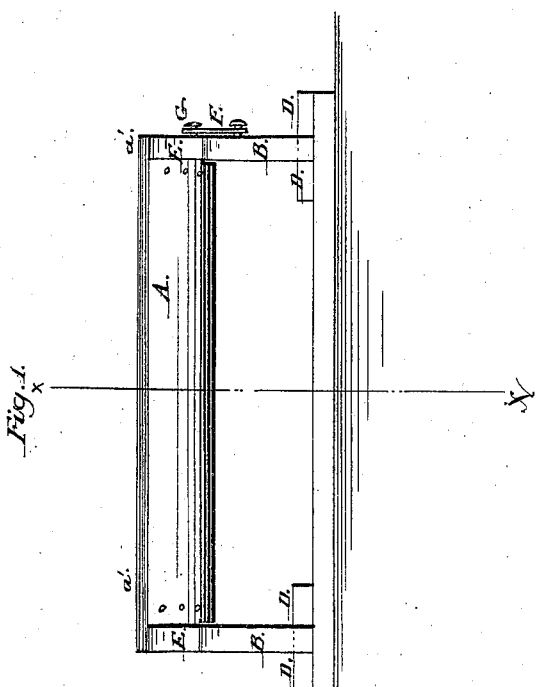
Witnesses:
Theo. Tusche
J. A. Service
Inventor:
Columbus Aulls
Per Munn & Co.
Attorneys

United States Patent Office.

COLUMBUS AULLS, OF BRIDGEWATER, MICHIGAN.

*Letters Patent No. 63,688, dated April 9, 1867.*

IMPROVEMENT IN SHEEP-FEEDING TROUGHS.

*The Schedule referred to in these Letters Patent and making part of the same.*

TO ALL WHOM IT MAY CONCERN:

Be it known that I, COLUMBUS AULLS, of Bridgewater, in the county of Washtenaw, and State of Michigan, have invented a new and improved Revolving Sheep-Feeding Trough; and I do hereby declare that the following is a full, clear, and exact description thereof which will enable others skilled in the art to make and use the same, reference being had to the accompanying drawings, forming part of this specification, in which—

Figure 1 is a side view of my improved trough.

Figure 2 is a vertical cross-section of the same taken through the line $x\ x$, fig. 1

Similar letters of reference indicate like parts.

My invention has for its object to furnish a simple and easily-constructed trough for feeding grain, roots, &c., to sheep; and it consists in constructing the trough with the ends of one side extended for the attachment of the hinges, and so that the trough may turn down between the standard, in the combination of the counterbalances with the trough, to hold it in its proper position while the sheep are eating, and in the combination of the standards, having slats or braces attached to them with the trough, the whole being constructed and arranged as hereinafter more fully described.

A is the trough, which is made in the usual angular form, and in the usual manner, except that the side-board, $a'$, of one side, extends about two inches beyond the ends of the trough at each end. B are the standards, which I usually make of two-inch plank, and in the shape shown in fig. 2. To one of the inclined ends of the standards B the trough A is hinged, as shown in fig. 2, the hinges C being attached to the said inclined ends of the standards B, and to the projecting ends of the side-board $a'$ of the trough. This allows the trough A to be turned down into the position shown in red in fig. 2, which prevents snow or dirt from getting into the trough, keeping the trough always clean and ready for use, and saving the labor and time required for sweeping out and cleaning the trough when stationary troughs are used. D are slats or braces attached to the lower parts of the standards B to prevent them from tripping sidewise. E are counterbalances, which I usually make of two-inch plank, and in the shape shown in fig. 2, so as to conform to the shape of the standards B when the trough is in proper position for receiving the grain. The counterbalance E holds the trough steady while the sheep are eating, and also holds it steady when turned over, as shown in red in fig. 2. If thought advisable, a hook, F, may be attached to one or both the standards B, and a staple, G, to one or both the counterbalances E, to guard against the troughs being revolved while the sheep are feeding; but this hook I have seldom found necessary.

What I claim as new, and desire to secure by Letters Patent, is—

1. Constructing the trough A with one side-board $a'$ extended beyond the ends of the trough, substantially as herein shown and described, and for the purpose set forth.

2. The combination of the counterbalances E with the trough A, substantially as herein shown and described, and for the purpose set forth.

3. The combination of the standards B, having slats or braces D attached to them, with the trough A, substantially as herein shown and described, and for the purpose set forth.

4. Hinging the trough A to the standards B, substantially as herein shown and described, and for the purpose set forth.

COLUMBUS AULLS.

Witnesses:
  D. W. PALMER,
  ALBERT PALMER,
  MARCELLUS VAN GIESON.